Aug. 4, 1942.  T. M. McSHERRY  2,291,822
WEED PULLER
Filed July 22, 1940
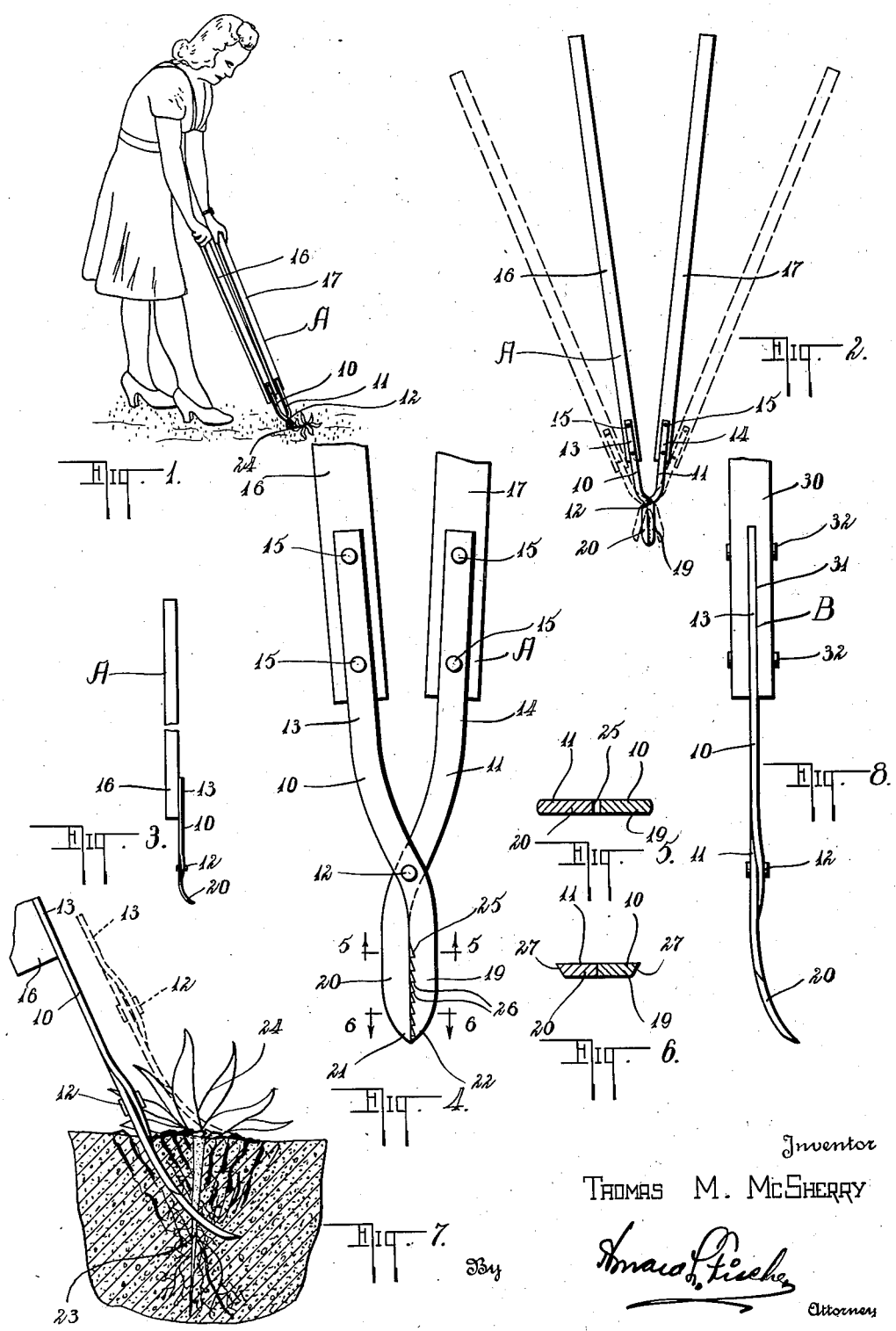
Inventor
THOMAS M. McSHERRY
By
Attorney Patented Aug. 4, 1942

2,291,822

UNITED STATES PATENT OFFICE 2,291,822

WEED PULLER

Thomas M. McSherry, St. Paul, Minn.

Application July 22, 1940, Serial No. 346,786

3 Claims. (Cl. 294—50.8)

My invention relates to an improvement in weed puller wherein it is desired to provide a tool capable of removing weeds and the like from the ground with a minimum of breakage to the roots of the weed.

A great variety of devices have previously been constructed for the purpose of removing weeds and other noxious plants from the ground. Many of these former devices are in the form of cultivating tools which dig up the entire plant and deposit the same upon the surface of the ground. Other devices have been provided for cutting the weeds beneath the surface of the ground. While such devices are useful for the removal of certain types of weeds, other types of weeds will grow again from the roots unless the roots are entirely or almost entirely removed from the ground.

It is the object of the present invention to provide a device designed to engage the body of the weed somewhat beneath the surface of the ground and to provide a means of removing the weed from the ground by this engagement beneath the surface. I have found that if the weed is pulled by the portion thereof projecting from the ground the roots often break off beneath the surface of the ground or at the ground surface. I have also found, however, that if the weeds are engaged beneath the surface of the ground and loosened, much of the tendency to break off the root of the weed is obviated.

It is a feature of my invention to provide a weed pulling device equipped with a pair of curved pivoted jaws which may be guided into the ground to move along an arcuated path into contact with the root of a weed or the like. The curvature of the jaws makes it possible to engage the weed while the jaws are extending at substantially right angles to the root thereof, without the necessity of lowering the handles of the jaws almost to the surface of the ground. The curvature of the jaws provides a firm engagement between the root of the weed and the jaws and at the same time this curved structure guides the jaws when inserted into the ground into proper engagement with the weed.

It is a further feature of my invention to provide a weed removing tool embodying a pair of pivoted jaws and to provide teeth on one of the jaws which prevents accidental disengagement of the weed or root from the jaws. These teeth are provided on one jaw only to prevent a sawtooth action of the jaws upon the weed when the weed is engaged therein. By providing teeth on one jaw the weed is prevented from accidental disengagement from the jaws and at the same time there is a lesser tendency to cut off the weed should the jaws slip slightly with respect to the weed.

It is a further feature of my invention that the engaging surfaces of the jaws present an elongated flat surface of engagement and at the same time the outer surfaces of the jaws are beveled in such a way as to permit the movement of the jaws through the earth with a minimum of effort. The shape of the jaws is such that the jaws may be forced through the earth without a great amount of pressure upon the jaw operating handles.

These and other objects and novel features of my invention will be more clearly and fully set forth in the following specification and claims.

In the drawing forming a part of my specification:

Figure 1 is a perspective view of my weed pulling device in use.

Figure 2 is a front view of my weed puller in closed position, illustrating in dotted outline the appearance of the device in open position.

Figure 3 is a side view of the weed puller shown in Figure 2.

Figure 4 is an enlarged detail view of the jaws of the weed puller, illustrating the construction thereof.

Figure 5 is a sectional view through the jaws, the position of the section being indicated by the line 5—5 of Figure 4.

Figure 6 is a second section through the jaws, illustrating the beveled shape of the outer edges thereof, the position of the section being indicated by the line 6—6 of Figure 4.

Figure 7 is a diagrammatic sectional view illustrating the weed puller with the jaws of the instrument inserted in the ground on either side of the body of the root, and in dotted outline, lifting the loosened weed out of the ground.

Figure 8 is a side view of a modified form of attachment between the pivoted jaws and the operating handle.

The weed puller A comprises a pair of levers 10 and 11 pivoted at 12. The upper portions 13 and 14, respectively, of the levers 10 and 11 are substantially flat and are secured by bolts, rivets or any suitable means indicated at 15 to the handles 16 and 17. The handles 16 and 17 may be formed of wood or any suitable material which may be easily engaged by the hande for operating the levers 10 and 11. Obviously, if it is preferred, the lever ends 13 and 14 above the pivot 12 could be extended to form levers for hand operation if it is so desired.

The jaw ends 19 and 20 of the levers 10 and 11 are of the shape best illustrated in Figures 3 and 4 of the drawing. The jaws 19 and 20 taper at their forward ends to points 21 and 22 which are in contact. The jaws 19 and 20 are curved as viewed from the side, as best illustrated in Figure 3 of the drawing. This curvature acts to guide the jaws along an arcuated path when inserted into the ground and to bring the jaws substantially horizontal in their engagement with a substantially vertically extending root 23 of a weed such as 24.

One of the jaws, such as 19, is provided with teeth 25 which are preferably shaped similarly to ratchet teeth so as to provide a series of successive shoulders 26 to prevent the body or stem of the weed from working outwardly from between the jaws 19 and 20. The outer edges of the jaws 19 and 20 are beveled, as illustrated in Figure 6, and indicated by the numeral 27. This bevel insures the full width of the jaws at the upper surface of the same but cuts away portions of the jaws on the under surface of the same so that the outer forward edges of the jaws are relatively sharp. The jaws may thus pass through the earth with a minimum of ease and with a minimum of back pressure. This beveled shape also tends to guide the jaws along an arcuated path as they are inserted into the ground. The beveled edges on the jaws tend to curve the path of the jaws during the insertion process.

In Figure 8 of the drawing, I disclose a weed puller B which is virtually identical with the weed puller previously described. The jaws 10 and 11 illustrated in Figure 8 are identical with the jaws previously described and identified by these same numerals. In place of having the ends 13 and 14 of the levers 10 and 11 overlying the surface of the handles 16 and 17, the construction shown in Figure 8 discloses handles such as 30 having an elongated slot 31 in one end of each of the same to admit the ends 13 and 14 of the levers 10 and 11. Thus the handle ends 13 and 14 are engaged in the slots 31 and are held in place by bolts or rivets 32 which extend through the bifurcated handle ends and through openings in the ends 13 and 14 of the levers.

The operation of my weed puller is believed clearly indicated by the foregoing description. The pointed ends 21 and 22 of the levers 10 and 11 are placed into contact with the ground at some distance from the weed 24. A force is then exerted upon the handles 16 and 17 to force the jaws 19 and 20 into the ground. The jaws 19 and 20 straddle the root 23 of the weed 24 and by moving the handles 16 and 17 together slightly the jaws 19 and 20 may be engaged about the root of the weed. By shaking the handles slightly or by reciprocating the levers 10 and 11, the weed 24 may be shaken loose and the engagement of the weed beneath the surface of the ground has a tendency to maintain the weed intact. By pulling the weed from beneath the surface of the ground, less of the weed remains in the ground beneath the jaws and for this reason the same tendency is not found to break off the roots of the weeds as if the weeds were engaged above the surface of the ground. After the weeds have been reciprocated slightly and shaken loose, these weeds may be picked out of the ground by means of the jaws 19 and 20 by proper manipulation of the handles 16 and 17.

It will be seen that during insertion of the blade, the jaws follow an arcuated path so that the portion of the blades engaging the weed are at substantially right angles to the root of the weed.

In accordance with the patent statutes I have described the principles of construction and operation of my weed puller and while I have endeavored to set forth the best embodiments thereof, I desire to have it understood that obvious changes may be made within the scope of the following claims without departing from the spirit of my invention.

I claim:

1. A weed puller comprising a pair of crossed pivotally connected levers, opposed flat jaws on one end of each of said levers, said flat jaws being curved to provide an arcuated engaging surface between said jaws, a pointed end on said jaws, and a beveled outer surface on said jaws adjacent said pointed ends.

2. A weed puller including a pair of pivoted jaws, said jaws having opposed engaging arcuated surfaces, a tapered end on each of said jaws, a beveled outer surface on each of said jaws, and tooth means on the engaging surface of one of said jaws.

3. A weed puller comprising a pair of crossed pivoted levers elongated thin jaw means on one end of said levers, said jaw means having opposed arcuated engaging surfaces, tapered free ends on said jaw means, and beveled outer and under surfaces on said jaw means adjacent said pointed ends.

THOMAS M. McSHERRY.